US006448330B1

(12) United States Patent
Inoue et al.

(10) Patent No.: US 6,448,330 B1
(45) Date of Patent: Sep. 10, 2002

(54) AQUEOUS EMULSION AND PROCESS FOR PRODUCING THE SAME

(75) Inventors: Toshihiro Inoue, Kamakura; Hidekazu Haneda, Yokosuka, both of (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/701,305

(22) PCT Filed: May 28, 1999

(86) PCT No.: PCT/JP99/02844

§ 371 (c)(1),
(2), (4) Date: Feb. 28, 2001

(87) PCT Pub. No.: WO99/61484

PCT Pub. Date: Dec. 2, 1999

(30) Foreign Application Priority Data

May 28, 1998 (JP) ............................................. 10-164225

(51) Int. Cl.⁷ ............................ C08L 25/04; C08L 33/06
(52) U.S. Cl. ........................ 524/803; 524/819; 524/832
(58) Field of Search ................................. 524/803, 379, 524/386, 819, 832; 525/59

(56) References Cited

FOREIGN PATENT DOCUMENTS

| JP | 6-41210 A | * | 2/1994 |
| JP | 8-245706 A | * | 9/1996 |
| JP | 8-325312 A | * | 12/1996 |

* cited by examiner

Primary Examiner—Christopher Henderson
(74) Attorney, Agent, or Firm—Armstrong, Westerman & Hattori, LLP

(57) ABSTRACT

A highly stable aqueous emulsion of a polymer predominantly comprised of units of at least one monomer selected from acrylate esters, methacrylate esters, styrenic monomers and diene monomers, which is dispersion-stabilized with a water-soluble compound having a molecular weight of at least 300 and an alcoholic hydroxyl group; characterized by having an average particle diameter of 0.05–5 μm, a calcium chloride chemical stability index of at least 20 and a surface tension of at least 45 mN/m as measured at a solid content of 30 wt. %. The aqueous emulsion is produced by polymerizing a monomer or monomers in the presence of an alcohol and a polymerization initiator generating a peroxide free-radical in an aqueous medium, while the monomer or monomers and the alcoholic hydroxyl group-containing water-soluble compound are incorporated continuously or intermittently into a polymerization system.

7 Claims, No Drawings

AQUEOUS EMULSION AND PROCESS FOR PRODUCING THE SAME

TECHNICAL FIELD

This invention relates to an aqueous emulsion of a homopolymer or copolymer of at least one monomer selected from the group consisting of an acrylic acid ester monomer, a methacrylic acid ester monomer, a styrenic monomer and a diene monomer, and to a process for producing the aqueous emulsion.

BACKGROUND ART

Emulsions of homopolymers and copolymers prepared by polymerizing various ethylenically unsaturated monomers and diene monomers, such as a styrene-butadiene copolymer emulsion, an acrylic acid ester resin emulsion, a methacrylic acid ester resin emulsion and a vinyl ester resin emulsion, are widely used as an adhesive, a coating composition, a binder, a fiber-treating agent and a mortar-ingredient.

The above-mentioned emulsions are produced usually by emulsion-polymerizing an ethylenically unsaturated monomer and/or a diene monomer in the presence of a surface active agent or a water-soluble high-molecular-weight compound such as polyvinyl alcohol (hereinafter abbreviated to "PVA") or hydroxyethyl cellulose.

By using a surface active agent for polymerization, standing stability, mechanical stability, chemical stability, freeze-thaw stability and pigment-miscibility of the polymer emulsion can be maintained at a certain level but the level is not satisfactorily high. The polymer emulsion produced by an emulsion polymerization procedure using a surface active agent as an emulsifier generally has a low viscosity, and therefore, when the polymer emulsion is used in a field where a high viscosity is required, a thickening agent must be added or a unsaturated acid must be copolymerized followed by alkali addition for increase of viscosity. The addition of a thickening agent and the copolymerization of an unsaturated acid lead to deterioration of water resistance of a final product of the emulsion. Further, the surface active agent is liable to migrate in the final product with the result of deterioration of various properties.

A polymer emulsion prepared by polymerizing vinyl acetate or vinyl chloride in the presence of a water-soluble high-molecular-weight compound such as a PVA polymer as an emulsion stabilizer is satisfactory in various dispersion stabilities such as mechanical stability and chemical stability and in the fact that a desired viscosity is obtained by controlling the polymerization procedure and conditions. However, these advantages can be achieved only with limited polymer emulsions prepared from monomers having a high free-radical polymerizability such as vinyl acetate and vinyl chloride. Stable polymer emulsions cannot be prepared from monomers having a relatively low free-radical polymerizability such as a styrenic monomer, a diene monomer, an acrylic acid ester monomer and a methacrylic acid ester monomer.

A proposal of conducting a polymerization of a styrenic monomer, a diene monomer, an acrylic acid ester monomer or a methacrylic acid ester monomer by using a PVA polymer having a mercapto group as an emulsion stabilizer was made in Japanese Unexamined Patent Publication (hereinafter abbreviated to "JP-A") No. S60-197229. But, research of the present inventors has revealed that good polymerization stability can be obtained only when a special initiator, such as potassium bromate, capable of generating a free-radical due to the reaction with a mercapto group in the PVA polymer is used. Good polymerization stability cannot be obtained with ordinary initiators. Further, it is pointed out that the use of the PVA polymer having a mercapto group has a problem such that polymerization inevitably stops when the whole amount of mercapto group is consumed.

A process for producing an aqueous polymer emulsion wherein an ethylenically unsaturated monomer or a diene monomer is polymerized by using PVA as a dispersing agent in the presence of a small amount of a chain transfer agent having a mercapto group is described in JP-A H8-325312. This process has a problem such that gelation occurs during polymerization due to the presence of the chain transfer agent (see Comparative Example 6 given below). A process for producing an aqueous emulsion of a homopolymer or copolymer from an acrylic acid ester monomer, a methacrylic acid ester monomer, a styrenic monomer, a diene monomer or a halogenated vinyl monomer is described in JP-A H8-104703. In this process, a special vinyl alcohol polymer must be used as a dispersing agent, which satisfies the special requirements for the viscosity average degree of polymerization, the ratio of weight average molecular weight/number average molecular weight, and the maximum peak of molecular weight in the molecular weight distribution, and therefore, this process is limited in utilization.

Thus, a process for stably producing an aqueous emulsion of a homopolymer or copolymer from an acrylic acid ester monomer, a methacrylic acid ester monomer, a styrenic monomer, a diene monomer or a halogenated vinyl monomer has not proposed, wherein these monomers are polymerized by using a protective colloid of a general water-soluble high-molecular-weight compound as a dispersing agent.

DISCLOSURE OF THE INVENTION

A primary object of the present invention is to provide an aqueous polymer emulsion having an extremely enhanced stability, and a process for producing the aqueous polymer emulsion by homopolymerizing or copolymerizing an acrylic acid ester monomer, a methacrylic acid ester monomer, a styrenic monomer or a diene monomer by using as a dispersing agent a water-soluble high molecular-weight compound having an alcoholic hydroxyl group which is a protective colloid of a general water-soluble high-molecular-weight compound.

Through a research into a process for stably producing an aqueous polymer emulsion from an acrylic acid ester monomer, a methacrylic acid ester monomer, a styrenic monomer or a diene monomer by using as a dispersing agent a protective colloid of a general water-soluble high-molecular-weight compound, the present inventors have found that the above-mentioned object can be achieved by a process wherein the polymerization is carried out by using a vinyl alcohol polymer as a dispersing agent, while the monomer or monomers are incorporated into a polymerization system in a special manner. Based on this finding, the present invention has been completed.

Thus, in one aspect of the present invention, there is provided an aqueous emulsion of a homopolymer consisting of units of a monomer selected from the group consisting of an acrylic acid ester monomer, a methacrylic acid ester monomer, a styrenic monomer and a diene monomer, or a copolymer predominantly comprised of units of at least one monomer selected from said group of monomers, which is dispersion-stabilized with a water-soluble high-molecularweight compound having a molecular weight of at least 300 and having an alcoholic hydroxyl group;

characterized in that said homopolyme or copolymer is in the form of particles having an average particle diameter of 0.05 μm to 5 μm and said aqueous emulsion has a calcium chloride chemical stability index of at least 20 and a surface tension of at least 45 mN/m as measured at a solid content concentration of 30% by weight;

that the amount of the water-soluble high-molecular-weight compound having an alcoholic hydroxy group is in the range of 0.01 to 100 parts by weight based on 100 parts by weight of the homopolymer or the copolymer;

that at least part of the water-soluble high molecular-weight compound having an alcoholic hydroxyl group is graft-bonded to the homopolymer or copolymer; and further that the amount of the homopolymer or copolymer having graft-bonded thereto the water-soluble high-molecular-weight compound having an alcoholic hydroxyl group is in the range of 0.5% to 30% by weight based on the sum of the homopolymer or copolymer having grafted thereto the water-soluble high-molecular-weight compound having an alcoholic hydroxyl group and the homopolymer or copolymer, to which the water-soluble high-molecular-weight compound having an alcoholic hydroxyl group has not been grafted.

In another aspect of the present invention, there is provided a process for producing the above-mentioned aqueous emulsion, characterized in that either one kind of a monomer selected from the group consisting of an acrylic acid ester monomer, a methacrylic acid ester monomer, a styrenic monomer and a diene monomer, or a monomer mixture predominantly comprised of at least one kind of a monomer selected from said group of monomers, is polymerized in an aqueous medium in the presence of an alcohol and a polymerization initiator generating a peroxide free-radical as the sole polymerization initiator, while the monomer or monomer mixture and a water-soluble high-molecular-weight compound having a molecular weight of at least 300 and having an alcoholic hydroxyl group are incorporated continuously or intermittently into a polymerization system.

BEST MODE FOR CARRYING OUT THE INVENTION

The monomer used for the preparation of a polymer in the aqueous emulsion of the invention is a monomer selected from the group consisting of an acrylic acid ester monomer, a methacrylic acid ester monomer, a styrenic monomer and a diene monomer, or a monomer mixture predominantly comprised of at least one kind of a monomer selected from said group of monomers.

As specific examples of the acrylic acid ester monomer, there can be mentioned methyl acrylate, ethyl acrylate, butyl acrylate, 2-ethylhexyl acrylate, dodecyl acrylate, and dimethylaminoethyl acrylate and its quarternized product.

As specific examples of the methacrylic acid ester monomer, there can be mentioned methyl methacrylate, ethyl methacrylate, butyl methacrylate, 2-ethylhexyl methacrylate, dodecyl methacrylate, dimethylaminoethyl methacrylate and its quarternized product, and ethylene glycol dimethacrylate.

As specific examples of the styrenic monomer, there can be mentioned styrene, α-methylstyrene, vinyltoluene, and p-styrenesulfonic acid and a sodium salt or potassium salt thereof.

As specific examples of the diene monomer, there can be mentioned 1,3-butadiene, 2-methyl-1,3-butadiene, 2,3-dimethyl-1,3-butadiene, 2-chloro-1,3-butadiene and 1,3-pentadiene.

Monomers, which are capable of being copolymerized with the above-mentioned monomers used as the predominant ingredient for the copolymerization, include for example halogenated monomers and carboxylic acid vinyl ester monomers. These copolymerizable monomers are used in an amount such that the object and effects of the invention are attained. The amount thereof is usually not larger than 50% by weight based on the total weight of the monomers.

As specific examples of the halogenated vinyl monomer, there can be mentioned vinyl chloride, vinylidene chloride, vinyl fluoride and vinylidene fluoride. As specific examples of the carboxylic acid vinyl ester monomer, there can be mentioned vinyl formate, vinyl acetate, vinyl propionate, vinyl versatate, vinyl pivalate and isopropenyl acetate. As specific examples of the halogenated vinyl monomer, there can be further mentioned unsaturated monomcarboxylic acids such as acrylic acid and methacrylic acid; polycarboxylic acids and partial esters thereof such as fumaric acid, maleic acid, itaconic acid, maleic anhydride, phthalic anhydride, trimellitic anhydride and itaconic anhydride; olefins such as ethylene, propylene, 1-butene and isobutene; vinyl ethers such as methyl vinyl ether, n-propyl vinyl ether, i-propyl vinyl ether, n-butyl vinyl ether, i-butyl vinyl-ether, t-butyl vinyl ether and dodecyl vinyl ether; nitriles such as acrylonitrile and methacrylonitrile; allyl compounds and methallyl compounds such as allyl acetate, methallyl acetate, allyl chloride and methallyl chloride, salts and esters of unsaturated carboxylic acids such as dimethyl fumarate, diethyl maleate and diisopropyl itaconate; vinylsilyl compounds such as vinyltrimethoxysilane; and vinylpridine and N-vinylpyrrolidone.

In the process for producing the aqueous polymer emulsion of the invention, first, the above-mentioned monomer or monomers and a water-soluble high-molecular-weight compound having a molecular weight of at least 300 and having an alcoholic hydroxyl group (hereinafter abbreviated to "alcoholic hydroxyl group-containing high-molecular-weight compound") are incorporated in a polymerization system where polymerization is conducted in the presence of an alcohol and a polymerization initiator capable of being decomposed to generate a peroxide free-radical as the sole polymerization initiator in an aqueous medium. By the term "aqueous medium" used herein we mean water and a mixture of water and an optional water-soluble solvent such as an alcohol. The monomer or monomers and the alcoholic hydroxyl group-containing high-molecular-weight compound may be incorporated in the polymerization system either separately or as a mixture in an emulsion form comprising the monomer or monomers, the alcoholic hydroxyl group-containing high-molecular-weight compound and water. In the case when the monomer or monomers and the alcoholic hydroxyl group-containing high-molecular-weight compound are separately incorporated, these two ingredients are preferably simultaneously incorporated. If a large amount of the monomer or monomers is incorporated prior to the alcoholic hydroxyl group-containing high-molecular-weight compound, coagulated mass is liable to occur. In contrast, if a large amount of the alcoholic hydroxyl group-containing high-molecular-weight compound is incorporated prior to the monomer or monomers, viscosity of the polymerization system increases and coagulated mass is liable to occur. It is not essential but preferable that the incorporation of the two ingredients is completed at the same time. The monomer or monomers and the alcoholic hydroxyl group-containing high-molecular-weight compound are incorporated continuously or intermittently. It is essential to incorporate the monomer or monomers and the alcoholic hydroxyl group-containing high-molecular-weight compound with the advance of polymerization. If the homopolymer or copolymer is produced by a polymerization procedure other than an emulsion polymerization procedure, and thereafter the homopolymer or copolymer or an aqueous solution thereof is emulsified in a forced emulsification manner or a self-emulsification manner by adding the alcoholic hydroxyl group-containing high-molecular-weight compound, then the resulting aqueous polymer emulsion is greatly inferior in various stabilities to the aqueous polymer emulsion of the present invention. Also, if an aqueous emulsion of the homopolymer or copolymer is produced by an emulsion polymerization procedure using a surface active agent or a post emulsification procedure, followed by incorporation of the alcoholic hydroxyl group-containing high-molecular-weight compound, then the resulting aqueous polymer emulsion is similarly inferior in various stabilities to the aqueous polymer emulsion of the present invention.

If the whole amount of the monomer or monomers used is incorporated alone or along with the alcoholic hydroxyl group-containing high-molecular-weight compound in an initial stage of polymerization, followed by incorporation of a polymerization initiator to initiate the polymerization, then the conversion of monomer becomes unstable and other problems arise and the object of the present invention cannot be attained.

In the process for producing the aqueous polymer emulsion of the present invention, it is also essential to carry out the polymerization in the presence of an alcohol for obtaining an aqueous polymer emulsion superior in various stabilities. The alcohol may be incorporated in a polymerization system as the solvent or a part thereof for dissolving the polymerization initiator therein. The alcohol used is not particularly limited, and may be either monohydric or polyhydric. As specific examples of the alcohol, there can be mentioned methanol, ethanol, propanol, butanol, ethylene glycol, propylene glycol and. glycerol. The amount of the alcohol is usually in the range of 0.5 to 50 parts by weight, preferably 1 to 30 parts by weight and more preferably 2 to 20 parts by weight, based on 100 parts by weight of the monomer or monomer mixture.

If an alcohol is not present or is present only to an extremely minor amount, an aqueous polymer emulsion having an enhanced stability cannot be obtained. The reason for which the stability of the aqueous polymer emulsion is enhanced by the presence of an alcohol is not clearly elucidated, but it is presumed to be based on the following mechanism although the present invention is not bound thereto. If an alcohol is not present, hydrogen abstraction from PVA polymer by a peroxide free-radical easily occurs whereby PVA radicals are produced and these PVA radicals are bound together to give a precipitate. In contrast, when an alcohol is present, a peroxide free-radical reacts with the alcohol to effect hydrogen abstraction from the alcohol to produce an alcohol free-radical. The thus-produced alcohol free radical exhibits a lower rate of hydrogen abstraction from PVA polymer than the hydrogen abstraction rate of the peroxide free-radical from PVA polymer. Therefore, the production of PVA radicals is suppressed and thus binding of PVA radicals is minimized with the result of avoidance of unstablization of the polymerization system.

In the above-mentioned polymerization process, it is also essential to use a polymerization initiator generating a peroxide free-radical as the sole polymerization initiator. By the term "peroxide free-radical" used herein we mean a free-radical having a structure such that is produced by scission of O—O bond of a peroxide. As specific examples of the polymerization initiator generating a peroxide free-radical, there can be mentioned water soluble peroxides such as potassium persulfate, ammonium persulfate and hydrogen peroxide; oil soluble peroxides such as tert.-butyl hydroperoxide, benzoyl peroxide and di-tert.-butyl peroxide; and redox initiators such as those which are combinations of, for example, a peroxide with sodium hydrogen bisulfite or other reducing agents. Of these, water soluble peroxides are preferable. A persulfate salt is most preferable. The amount of the polymerization initiator is usually in the range of 0.05 to 3 parts by weight, preferably 0.1 to 2 parts by weight based on 100 parts by weight of the monomer or monomers. If a polymerization initiator incapable of generating a peroxide free-radical is used, an aqueous emulsion having good stability cannot be used.

The procedure by which the polymerization initiator is incorporated is not particularly limited. As examples of the procedure, there can be mentioned a procedure of incorporating the entire amount of the polymerization initiator in a polymerization vessel before the polymerization; a procedure of incorporating a part of the polymerization initiator in a polymerization vessel before the polymerization, and, after the commencement of polymerization, additionally incorporating the remainder of polymerization initiator at a predetermined time; and a procedure of incorporating a part of the polymerization initiator in a polymerization vessel before the polymerization, and, after the commencement of polymerization, continuously or intermittently incorporating the remainder of polymerization initiator along with the addition of the monomer or monomers and the alcoholic hydroxyl group-containing water-soluble high-molecular-weight compound.

The alcoholic hydroxyl group-containing water-soluble high-molecular-weight compound used in the present invention includes, for example, vinyl alcohol polymers such as polyvinyl alcohol and modification products thereof; a saponification product of a copolymer of vinyl acetate with acrylic acid, methacrylic acid or maleic anhydride; cellulose derivatives such as alkyl cellulose, hydroxyalkyl cellulose, alkylhydroxyalkyl cellulose and carboxymethyl cellulose; starch derivatives such as alkyl starch, carboxymethyl starch and oxidized starch; gum arabic, tragacanth gum; and polyalkylene glycol. Of these, vinyl alcohol polymers are preferable in view of commercially available polymers with stable quality.

The vinyl alcohol polymers are not particularly limited provided that they are substantially water-soluble and capable of producing a stable emulsion. Usually the vinyl alcohol polymers are obtained by saponifying by an ordinary procedure vinyl ester polymers which are prepared by polymerizing vinyl monomer or monomers consisting of or predominantly comprised of a vinyl ester monomer by a convention polymerization procedure, and which include a homopolymer of a vinyl ester monomer, a copolymer of at least two vinyl ester monomers, and a copolymer of a vinyl ester monomer with other ethylenically unsaturated monomer. The vinyl alcohol polymers may be modified, for example, by an epoxy group introduced into the main chain, side chains or terminals of the polymer.

Any vinyl ester monomers can be used provided that they are capable of being subjected to free-radical polymerization. As specific examples of the vinyl ester monomer, there can be mentioned vinyl formate, vinyl acetate, vinyl propionate, isopropenyl acetate, vinyl valerate, vinyl caprate, vinyl laurate, vinyl stearate, vinyl benzoate, vinyl versatate and vinyl pivalate. Of these, vinyl acetate is most popularly used because it is commercially available and inexpensive.

If desired, a monomer copolymerizable with the vinyl ester monomer can be used for producing a copolymer of the vinyl ester monomer. As examples of the copolymerizable monomer, there can be mentioned olefins such as ethylene, propylene, 1-butene and isobutene, unsaturated carboxylic acids and anhydrides thereof such as acrylic acid, methacrylic acid, fumaric acid, maleic acid, itaconic acid, maleic anhydride, phthalic anhydiride, trimellitic anhydride and itaconic anhydride; acrylic acid esters such as methyl acrylate, ethyl acrylate, n-propyl acrylate, i-propyl acrylate, n-butyl acrylate, t-butyl acrylate, 2-ethylhexyl acrylate, dodecyl acrylate and octadecyl acrylate; methacrylic acid esters such as methyl methacrylate, ethyl methacrylate, n-propyl methacrylate, i-propyl methacrylate, n-butyl methacrylate, t-butyl methacrylate, 2-ethylhexyl methacrylate, dodecyl methacrylate and octadecyl methacrylate; unsaturated carboxylic acid esters such as dimethyl fumarate, diethyl maleate and diisopropyl itaconate; vinyl ethers such as methyl vinyl ether, n-propyl vinyl ether, i-propylvinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl or vinylidene halides such as vinyl chloride, vinylidene chloride, vinyl fluoride and vinylidene fluoride; allyl compounds allyl acetate and allyl chloride; sulfonic acid group-containing compounds such as ethylenesulfonic acid, allylsulfonic acid, methallylsulfonic acid and 2-acrylamide-2-methylpropanesulfonic acid; vinylsilane compounds such as vinyltrimethoxysilane; and quaternary ammonium group-having monomers such as 3-acrylamidepropyltrimethylammonium chloride and 3-methacrylamidepropyltrimethylammonium chloride.

The saponification degree of the vinyl ester polymer varies depending upon the presence or absence of a modification group and the kind of the modification group. Preferably the saponification degree is in the range of 40 to 99.99% by mole, more preferably 50 to 99.9% by mole and most preferably 60 to 99.9% by mole in view of the water-solubility and other properties of the resulting vinyl alcohol polymer. If the saponification degree of the vinyl ester polymer is smaller than 40% by mole, dispersion stability of polymer particles is reduced.

The viscosity average degree of polymerization of the vinyl ester polymer is usually in the range of 50 to 8,000, preferably 100 to 6,000 and more preferably 100 to 5,000. If the viscosity average degree of polymerization is smaller than 50, the polymerization stability is poor. In contrast, viscosity average degree of polymerization is larger than 8,000, the viscosity of the aqueous polymer emulsion becomes very high and the removal of heat at the step of production of the emulsion becomes difficult.

The amount of the alcoholic hydroxyl group-containing water-soluble high-molecular-weight compound is in the range of 0.01 to 100 part by weight, preferably 0.05 to 50 parts by weight and more preferably 1 to 20 parts by weight based on 100 parts by weight of the monomer or monomers. When the amount of this compound is smaller than 0.01 part by weight, the stability at the step of polymerization is poor and a salient amount of coagulated mass are produced, the mechanical stability and chemical stability of the aqueous polymer emulsion are reduced, and the strength of film obtained therefrom is reduced. In contrast, when the amount of this compound is larger than 100 parts by weight, removal of the heat of reaction becomes difficult due to the viscosity increase of the polymerization system, the resulting polymer emulsion becomes too thick in viscosity and becomes difficult to handle, and the water resistance of film obtained therefrom is reduced.

In the emulsion polymerization, conventional emulsifiers including nonionic, anionic, cationic and amphoteric surface active agents can be used provided that the object and effect of the invention are attained. Of these anionic surface active agents are preferable.

As specific examples of the emulsifiers, there can be mentioned anionic surface active agents such as higher alcohol sulfate esters, alkylbenzenesulfonate salts, aliphatic sulfonate salts, polyoxyethylene alkylarylsufonate salts and polyphosphate salts; nonionic surface active agents such as polyethylene glycol alkyl esters, polyethylene glycol alkylphenyl ethers and polyethylene glycol alkyl ethers; cationic surface active agents such as aliphatic amine salts and quaternary ammonium salts thereof, aromatic quaternary ammonium salts and heterocyclic quaternary ammonium salts; and amphoteric surface active agents such as carboxybetaine, sulfobetaine, aminocarboxylate salts and imidazoline derivatives. These emulsifiers may be used either alone or as a combination of at least two thereof. In the case when the emulsifier is used, the amount thereof is usually in the range of 0.1 to 5 parts by weight based on 100 parts by weight of the monomer or monomers. When the amount of the emulsifier is too large, the alcohol dispersibility become poor.

The relative amount of the monomer or monomers used for polymerization to the aqueous polymerization medium is not particularly limited but is usually in the range of 10 to 70 parts by weight, preferably 20 to 50 parts by weight based on 100 parts by weight of the monomer or monomers.

The rate of addition of the monomer or monomers is not particularly limited, but the monomer or monomers are incorporated preferably in a manner such that the conversion is maintained at 10% by weight or more during polymerization. Preferably the conversion is maintained at 20% by weight or more and more preferably at 30% by weight or more during polymerization. If the rate of addition of the monomer or monomers is too high, the conversion becomes undesirably low and coarse particles are liable to occur. In contrast, if the rate of monomer addition is too low, the viscosity of the polymerization system tends to increase.

Therefore, the time required for addition of the monomer or monomers and the alcoholic hydroxyl group-containing high-molecular-weight compound is usually at least one hour, preferably at least 2 hours and not more than 20 hours.

The polymerization temperature is not particularly limited, but is usually in the range of 0° C. to 100° C., preferably 5° C. to 95° C.

After completion of the addition of the monomer or monomers, if desired, the polymerization is continued until a desired polymerization conversion is reached, and then the polymerization is terminated. The termination of polymerization can be effected by adding a polymerization stopper or cooling the polymerization system. Other polymerization conditions and procedures are not particularly limited, and those which are hitherto known in the conventional emulsion polymerization procedures can be employed.

A chain transfer agent can be used in the polymerization. An effect of enhancing the polymerization stability can be obtained by using a chain transfer agent.

The chain transfer agent used is not particularly limited provided that a chain transfer occur. As specific examples of the chain transfer agent, there can be mentioned mercaptans such as n-hexyl mercaptan, n-octyl mercaptan, t-octyl mercaptan, n-dodecyl mercaptan, t-dodecyl mercaptan and n-stearyl mercaptan; mercapto group-containing compounds such as thioglycollic acid, thiomalic acid and 2-ethylhexyl thioglycollate; xanthogen compounds such as dimethylxanthogen disulfide and diisopropylxanthogen disulfide; α-methylstyrene dimers such as α-methylstyrene dimer, 2,4-diphenyl-4-methyl-1-pentene, 2,4-diphenyl-4-methyl-2-pentene and 1,1,3-trimethyl-3-phenylindane; thiuram compounds such as terpinolene, tetramethylthiuram disulfide, tetraethylthiuram disulfide and tetramethylthiuram monosulfide; phenolic compounds such as 2,6-di-t-butyl-4-methylphenol and styrenated phenol; allyl compounds such as allyl alcohol, acrolein and methacrolein; halogenated hydrocarbon compounds such as dichloromethane, dibromomethane, carbon tetrachloride and carbon tetrabromide; vinyl ethers such as α-benzyloxystyrene, α-benzyloxyacrylonitrile and α-benzyloxyacrylamide; and triphenylethane and pentaphenylethane.

Of these, mercapto group-containing compounds are preferable in view of the efficiency of chain transfer. As the mercaptp group-containing compounds, preferable are those which have not more than 50 carbon atoms, more preferably not more than 30 carbon atoms and especially preferably not more than 20 carbon atoms. As examples of especially preferable mercapto group-containing compounds, there can be mentioned alkyl mercaptans such as n-octyl mercaptan, n-dodecyl mercaptan and t-dodecyl mercaptan, and 2-mercaptoethanol and 3-mercaptopropionic acid.

When a chain transfer agent is used, the amount thereof is usually in the range of 0.01 to 5 parts by weight based on 100 parts by weight of the monomer or monomers. If the amount of the chain transfer agent is smaller than 0.01 part by weight, the effect of enhancing polymerization stability is minor and the practicability is poor. In contrast, if the amount thereof is larger than 5 parts by weight, the polymerization stability is poor, and the resulting polymer has a very low molecular weight with the result of deterioration in physical properties of the polymer emulsion.

The procedure of incorporating a chain transfer agent is not particularly limited, and it may incorporated at a time, or intermittently or continuously.

Auxiliaries such as a plasticizer and an antifoaming agent can be added at the step of or after polymerization.

By the process of the present invention, an aqueous polymer emulsion having the following characteristics can be obtained.

The aqueous polymer emulsion of the invention has an average particle diameter of 0.05 to 5 µm, preferably 0.2 to 2 µm.

The mechanical stability of the aqueous polymer emulsion of the invention as measured by the Marlon type mechanical stability test at a pH value of 8 is excellent, i.e., the amount of coagulated mass produced is not larger than 0.1% by weight.

There is no need of introducing a carboxylic group in the polymer molecule, and therefore, the change of viscosity of the polymer emulsion depending upon the pH value is not observed, and film formed from the polymer emulsion exhibits enhanced water-resistance.

The aqueous polymer emulsion of the invention has excellent chemical stability, especially for a divalent inorganic salt. For example, even when an aqueous calcium chloride solution having a concentration of 30% by weight is incorporated with the same amount of the aqueous polymer emulsion having a concentration of 30% by weight, coagulation does not occur. The chemical stability index for calcium chloride of the aqueous polymer emulsion of the invention is at least 20, preferably at least 30. The definition of the chemical stability index for calcium chloride will be explained below.

The aqueous polymer emulsion of the invention does not contain a surface active agent, and therefore, has a surface tension of at least 45 mN/m, preferably at least 50 mN/m.

The aqueous polymer emulsion of the invention does not contain a surface active agent, and therefore, it is considered that the emulsion exhibits enhanced water-resistance and superior performances as adhesives.

The aqueous emulsion of the invention is an emulsion of a homopolymer consisting of units of a monomer selected from the group consisting of an acrylic acid ester monomer, a methacrylic acid ester monomer, a styrenic monomer and a diene monomer, or a copolymer predominantly comprised of units of at least one monomer selected from said group of monomers, and at least part of the water-soluble high-molecular-weight compound having an alcoholic hydroxyl group added as a dispersion stabilizer at the step of polymerization is graft-bonded to the homopolymer or copolymer. It is presumed that the excellent stability of the aqueous polymer emulsion of the invention is due to the graft-bonded water-soluble high-molecular-weight compound having an alcoholic hydroxyl group.

The amount of said part of the homopolymer or copolymer having graft-bonded thereto the water-soluble high-molecular weight compound having an alcoholic hydroxyl group is usually at least 0.5% by weight based on the sum of said part of the homopolymer or copolymer having grafted thereon the water-soluble high-molecular-weight compound having an alcoholic hydroxyl group and the homopolymer or copolymer, onto which the water-soluble high-molecular-weight compound having an alcoholic hydroxyl group has not been grafted. If the amount of the said part of the homopolymer or copolymer having graft-bonded thereto the alcoholic hydroxyl group-containing high-molecular-weight compound is smaller than 0.5% by weight, the aqueous emulsion is poor in stability. There is no upper limit of the relative amount of the homopolymer or copolymer having graft-bonded thereto the alcoholic hydroxyl group-containing water-soluble high-molecular-weight compound, but said amount is usually not larger than 30% by weight.

A free alcoholic hydroxyl group-containing water-soluble high-molecular-weight compound and a homopolymer or copolymer having graft-bonded thereto the alcoholic hydroxyl group-containing water-soluble high-molecular-weight compound, which are present in the aqueous emulsion, can be separated from each other, for example, by centrifugal separation. That is, the free alcoholic hydroxyl group-containing water-soluble high-molecular-weight compound remains in the aqueous emulsion, and the homopolymer or copolymer having graft-bonded thereto the alcoholic hydroxyl group-containing water-soluble high-molecular-weight compound is precipitated.

Further, the homopolymer or copolymer having graft-bonded thereto the alcoholic hydroxyl group-containing water-soluble high-molecular-weight compound can be separated from the homopolymer or copolymer, onto which the alcoholic hydroxyl group-containing water-soluble high-molecular-weight compound has not been grafted, by treating these with a peroxide free-radical whereby the alcoholic hydroxyl group-containing water-soluble high-molecularweight compound is insolubilized. The amount of the alcoholic hydroxyl group-containing water-soluble high-molecular-weight compound in the homopolymer or copolymer having graft-bonded thereto the water-soluble high-molecular-weight compound can be determined, for example, by a procedure wherein the hydroxyl group in the compound are converted to an appropriate derivative and the derivative is analyzed by NMR or other means.

The invention will now be specifically described by the following working examples that by no means limit the scope of the invention. % and parts in the working examples are by weight unless otherwise specified, and the amount of a latex is expressed in terms of the weight of the solid content.

The experimental data given in the working examples were determined by the following methods.

(1) Polymerization Stability (%)

An aqueous polymer emulsion as obtained by polymerization is filtered through a wire mesh with 200 mesh size, and the coagulated mass remaining on the filter is dried in a dryer maintained at a temperature of 105° C. and the dried mass is weighed. The polymerization stability is expressed in terms of the weight % of the dried coagulated mass based on the weight of the total solid content in the aqueous polymer emulsion.

(2) Weight Average Particle Diameter ($\mu$m)

The weight average particle diameter is determined by a granulometer Colter LS230 (supplied by Colter Co.).

(3) Particle Diameter Distribution

The particle diameter distribution is determined determined by a granulometer Colter LS230 (supplied by Colter Co.).

(4) Viscosity (mP.s)

The viscosity is measured by a BM viscometer using #4 rotor at 20° C. and 60 rpm.

(5) Surface Tension (mN/m)

The surface tension is determined on an aqueous polymer emulsion having a solid content of 30% by weight by using an auto-tension meter (Type 6801ES supplied by Rigousha K.K.) at 20° C.

(6) Chemical Stability (Calcium Chloride Chemical Stability Index)

An aqueous polymer emulsion is filtered through a wire mesh with 100 mesh size, and the solid content in the emulsion is adjusted to 30%. An equal volume of an aqueous calcium chloride solution containing 30% of calcium chloride is incorporated with the aqueous polymer solution having a solid content of 30% by weight. The mixture is filtered through a wire mesh with 100 mesh size and it is observed whether coagulated mass remains or not on the wire mesh. This test is repeated by using aqueous calcium chloride solutions having different calcium chloride concentrations. The calcium chloride chemical stability index is expressed in terms of the highest concentration (x%) of calcium chloride in an aqueous calcium chloride solution, at which concentration, coagulated mass does not remain on the wire mesh, when a mixture of the calcium chloride solution with the same amount of an aqueous polymer solution having the same solid content is filtered through the wire mesh. As the numerical value of the calcium chloride chemical stability index is larger, the aqueous polymer emulsion has a better chemical stability.

It is to be noted that chemical stability index can also be determined by using other electrolyte, e.g., sodium chloride, instead of calcium chloride.

(7) Mechanical Stability (CG8) (%)

Ph value of an aqueous polymer emulsion is adjusted to 8±0.1, and the aqueous emulsion is filtered through a wire mesh with 100 mesh size. Then the solid content in the emulsion is adjusted to 30%. The emulsion is filtered through a wire mesh with 100 mesh size and then subjected to a Marlon mechanical stability test at a revolution of 1,000 rpm and a load of 15 kg for 10 minutes. The tested emulsion is filtered through a wire mesh with a 100 mesh size, and the coagulated mass remaining on the wire mesh is dried and weighed. The mechanical stability is expressed in terms of the weight % of the dried coagulated mass (CG 8) based on the weight of the total solid content in the aqueous polymer emulsion.

(8) Graft Percentage (%)

The solid content in an aqueous polymer emulsion as obtained by polymerization is adjusted to 10% by weight, and 60 g of the emulsion is used as a test specimen. The specimen is subjected to centrifugal separation at a temperature of 5° C. and a revolution of 13,000 rpm for 60 minutes and a supernatant liquid is recovered in an amount of 40 g. 40 g of distilled water is added to the sediment layer (40 g) and stirred uniformly. Then the liquid is again subjected to centrifugal separation under the same conditions as those in the first centrifugal separation, and a supernatant liquid is recovered in an amount of 40 g. The sediment layer is processed in the same manner as mentioned above. The supernatant liquids obtained by the centrifugal separation repeated three times are collected together to obtain 120 g of liquid. The content of a solid in 120 g of the liquid, that is the amount (A) of the alcoholic hydroxyl group-containing water-soluble high-molecular-weight compound which has not been grafted onto the homopolymer or copolymer.

The amount (C) of the alcoholic hydroxyl group-containing water-soluble high-molecular-weight compound which has been grafted onto the homopolymer or copolymer is calculated by deducting the amount (A) from the total amount (B) of the alcoholic hydroxyl group-containing water-soluble high-molecular-weight compound in the specimen, i.e., the sum of the alcoholic hydroxyl group-containing water-soluble high-molecular-weight compound having been grafted onto the homopolymer or copolymer, plus the alcoholic hydroxyl group-containing water-soluble high-molecular-weight compound not having been grafted onto the homopolymer or copolymer.

The graft percentage, i.e., the ratio in percentage of the amount (C) of the hydroxyl group-containing water-soluble high-molecular-weight compound having grafted onto the homopolymer or copolymer to the amount of the homopolymer or copolymer is expressed by the following formula:

$$\text{graft percentage}=[C/(6-B)]\times 100 (\%)$$

EXAMPLE 1

To 90 parts of deionized water, a monomer mixture of 80 parts of styrene and 20 parts of ethyl acrylate, and 5 parts of polyvinyl alcohol (PVA-205, supplied by Kuraray Co., degree of polymerization: 550, degree of saponification: 88.5 mol %) were added, and the resulting mixture was stirred to give an emulsion of monomers.

A glass reaction vessel equipped with a reflux condenser, a dropping funnel, a thermometer, a nitrogen gas-blowing inlet and a stirrer was charged with 57 parts of distilled water and 3 parts of ethanol, and the mixture was heated to 80° C. Then, while the temperature was maintained at 80° C., a solution of 0.5 g of ammonium persulfate (polymerization initiator) in 10 parts of deionized water was added to the content in the reaction vessel. Two minutes after the addition of the polymerization initiator, addition of the above-mentioned monomer emulsion into the reaction vessel was commenced. The addition of the monomer emulsion was continued over a period of 4 hours, and, after the completion of addition, stirring was further continued for two hours. Then the conversion was determined, and the polymerization mixture was cooled to give a polymer emulsion A. The preparation conditions employed for polymer emulsion A are summarized in Table 1.

The solid content in polymer emulsion A was adjusted to 35%. The adjusted polymer emulsion A had a pH value of 2.2, a B-type viscosity of 100 Pa.s and a surface tension of 56 mN/m (see Table 3).

The chemical stability of polymer emulsion A was examined. A coagulated mass was not found even in an aqueous 30% calcium chloride solution, namely, the calcium chloride chemical stability index was at least 30. The Marlon mechanical stability test on polymer emulsion A having a pH value of 8 revealed that its CG8 was 0.0015%.

The solid content in polymer emulsion A was adjusted to 10%, and the graft percentage was determined on 60 g of the emulsion A having a solid content of 10%. A centrifugal separator H-2000A supplied by a domestic centrifugal separator maker was used. The graft percentage was calculated as 3.2% from the total solid concentration in the collected supernatant liquids of 0.09%, the total solid content (A) in the collected supernatant liquids of 0.11 g and the total amount (B) of the water-soluble high-molecular-weight protective colloid of 0.29 g by the following formula:

$$[0.18/(6-0.29) \times 100 = 3.2\%]$$

The ratio in % of the PVA having grafted onto the copolymer to the total amount of PVA used for the test was 62% as calculated by the following formula:

$$(0.18/0.29) \times 100 = 62\%$$

EXAMPLES 2–5

Using the monomer compositions and the alcoholic hydroxyl group-containing water-soluble high-molecular-weight compound, which are shown in Table 1, aqueous polymer emulsions B, C and D were prepared and the characteristics of polymer emulsions B, C and D were evaluated by the same procedures as described in Example 1. PVA-202E was polyvinyl alcohol having a degree of polymerization of 2,050 and a degree of saponification of 88%, supplied by Kuraray Co. The test results are shown in Table 1 and Table 3.

EXAMPLE 6

A pressure-resistant autoclave having a nitrogen gas-blowing inlet was charged with 90 parts of deionized water, 60 parts of styrene, 1 part of t-dodecyl mercaptan and 4 parts of polyvinyl alcohol (PVA-205, supplied by Kuraray Co., degree of polymerization: 350, degree of saponification: 88.0 mol %). The content was flushed with nitrogen, and 40 parts of butadiene was pressed into the autoclave through a pressure-resistant meter, and the resulting mixture was stirred to give an emulsion of monomers.

A pressure-resistant autoclave equipped with a nitrogen gas-blowing inlet and a thermometer was charged with 57 parts of distilled water and 3 parts of ethanol, and the mixture was flushed with nitrogen and then heated to 70° C. Then, while the temperature was maintained at 70° C., an aqueous 2% ammonium persulfate solution was pressed into the autoclave, and immediately the above-mentioned monomer emulsion was added over a period of 5 hours. After the completion of addition, stirring was further continued for 3 hours. Then the conversion was determined. The conversion was 95% (see Table 2). The polymerization mixture was cooled to give a styrene-butadiene copolymer emulsion F. The preparation conditions employed for emulsion F are summarized in Table 2. Emulsion F had a solid content of 49.0% and a viscosity of 90 mpa.s. The characteristics of emulsion F were evaluated by the same procedures as in Example 1 and the results are shown in Table 4.

Comparative Example 1

In this example, polyvinyl alcohol was added only before the addition of polymerization initiator and was not added after the commencement of polymerization.

To 90 parts of deionized water, 80 parts of styrene and 20 parts of ethyl acrylate was added, and the mixture was stirred to give a monomer mixture.

A glass reaction vessel equipped with a reflux condenser, a dropping funnel, a thermometer, a nitrogen gas-blowing inlet and a stirrer was charged with 57 parts of distilled water, 3 parts of ethanol and 5 parts of polyvinyl alcohol (PVA-205, supplied by Kuraray Co., degree of polymerization: 550, degree of saponification: 88.5 mol %), and the mixture was heated to 80° C. Then, while the temperature was maintained at 80° C., a solution of 0.5 part of ammonium persulfate in 10 parts of deionized water was added to the content in the reaction vessel.. About two minutes after the addition of the polymerization initiator, addition of the above-mentioned monomer mixture into the reaction vessel was commenced. When one hour elapsed from the commencement of the monomer mixture, a coagulated mass occurred, and, when two hours elapsed, the polymerization system gelled. The test results are shown in Table 2 and Table 4.

Comparative Example 2

In this example, polymerization was carried out by using a surface active agent.

To 90 parts of deionized water, a monomer mixture of 80 parts of styrene and 20 parts of ethyl acrylate, and 5 parts of sodium lauryl sulfate were added, and the mixture was stirred to give a monomer emulsion.

A glass reaction vessel equipped with a reflux condenser, a dropping funnel, a thermometer, a nitrogen gas-blowing inlet and a stirrer was charged with 57 parts of distilled water and 3 parts of ethanol, and the mixture was heated to 80° C. Then, while the temperature was maintained at 80° C., a solution of 0.5 part of ammonium persulfate in 10 parts of deionized water was added to the content in the reaction vessel. About two minutes after the addition of the polymerization initiator, addition of the above-mentioned monomer emulsion into the reaction vessel was commenced. The addition of the monomer emulsion was continued over a period of 4 hours. After the completion of addition, stirring was further continued for 2 hours. Then the conversion was determined and the polymerization mixture was cooled to give an aqueous polymer emulsion P.

The solid content in emulsion P was adjusted to 35%. The 35% emulsion P had a pH value of 2.3, a B-type viscosity of 400 mpa.s and a surface tension of 38 mN/m. The Marlon mechanical stability was 0.0067 at a pH of 8.0 and the calcium chloride chemical stability index was at least 5 and smaller than 1. The preparation conditions employed for emulsion P and the characteristics of emulsion F are shown in Table 2 and Table 4, respectively.

Comparative Example 3

In this example, polymerization was carried out by using a surface active agent and polyvinyl alcohol was added after polymerization.

To emulsion P prepared in Comparative Example 2, 5 parts of polyvinyl alcohol (PVA-205, supplied by Kuraray Co., degree of polymerization: 550, degree of saponification: 88.5 mol %) was added to give an aqueous polymer emulsion Q.

The solid content in emulsion Q was adjusted to 35%. The 35% emulsion P had a pH value of 2.3, a B-type viscosity of 560 mpa.s and a surface tension of 40 mN/m. The Marlon mechanical stability was 0.0067 at a pH of 8.0. The preparation conditions employed for emulsion Q and the characteristics of emulsion Q are shown in Table 2 and Table 4, respectively.

Comparative Example 4

In this example, polymerization was carried out by using PVA as a protective colloid.

A glass reaction vessel equipped with a ref lux condenser, a dropping funnel, a thermometer, a nitrogen gas-blowing inlet and a stirrer was charged with 147 parts of distilled water, 3 parts of ethanol and 5 parts of polyvinyl alcohol (PVA-205, supplied by Kuraray Co., degree of polymerization: 550, degree of saponification: 88.5 mol %), and then, 80 parts of styrene and 20 parts of ethyl acrylate were added. Then the mixture was heated to 80° C., and, while the temperature was maintained at 80° C., a solution of 0.5 part of ammonium persulfate as a polymerization initiator in 10 parts of deionized water was added to commence the polymerization. When 30 minutes elapsed from the commencement of polymerization, a coagulated mass occurred, and, when two hours elapsed, the polymerization system gelled. The test results are shown in Table 2 and Table 4.

Comparative Example 5

In this example, polymerization was carried out in the absence of an alcohol.

By the same procedures as described in Example 1, polymerization was carried out except that the amount of polyvinyl alcohol (PVA-205) was varied as shown in Table 2 and 3 parts of water was used instead of 3 parts of ethanol, but, the polymerization system gelled. The test results are shown Table 2 and Table 4.

Comparative Example 6

In this example, polymerization was carried out by using azobiisobutyronitrile as a polymerization initiator.

By the same procedures as described in Example 1, lymerization was carried out except that azobiisobutyronitrile (AIBN) was used instead of ammonium persulfate, but, the polymerization system gelled. The test results are shown in Table 2 and Table 4.

TABLE 1

| Example No. | Ex. 1 | Ex. 2 | Ex. 3 | Ex. 4 | Ex. 5 | Ex. 6 |
|---|---|---|---|---|---|---|
| Initial charge: | | | | | | |
| Deionized water | 57 | 57 | 57 | 57 | 45 | 57 |
| Ethanol | 3 | 3 | 3 | 3 | 15 | 3 |
| Styrene | — | — | — | — | — | — |
| Ethyl acrylate | — | — | — | — | — | — |
| PVA-205 | — | — | — | — | — | — |
| Polymerization initiator: | | | | | | |
| Potassium persulfate | — | 0.5 | 0.5 | 0.5 | — | — |
| Ammonium persulfate | 0.5 | — | — | — | 0.5 | 0.2 |
| Deionized water | 10 | 10 | 10 | 10 | 10 | 10 |
| Monomer emulsion: | | | | | | |
| Deionized water | 90 | 90 | 90 | 90 | 90 | 90 |
| Styrene | 80 | 40 | 40 | 80 | 80 | 60 |
| Ethyl acrylate | 20 | — | — | 20 | 20 | — |
| Butyl acrylate | — | 60 | 60 | — | — | — |
| Butadiene | — | — | — | — | — | 40 |
| Methacrylic acid | — | — | 2 | — | 1 | — |
| t-Dodecyl mercaptan | — | — | — | — | — | 1 |
| PVA-205 | 5 | — | — | 10 | 10 | 4 |
| PVA-220E | — | 10 | 10 | — | — | — |
| Sodium lauryl sulfate | — | — | — | — | — | — |
| Polymerization conditions: | | | | | | |
| Polymerization temperature (° C.) | 80 | 80 | 80 | 80 | 80 | 70 |
| Period of time for monomer addition (hours) | 4 | 4 | 4 | 4 | 4 | 5 |
| PVA-205 after-addition | — | — | — | — | — | — |
| Copolymer emulsion | A | B | C | D | G | F |

TABLE 2

| Comparative Example No. | C.E. 1 | C.E. 2 | C.E. 3 | C.E. 4 | C.E. 5 | C.E. 6 |
|---|---|---|---|---|---|---|
| Initial charge: | | | | | | |
| Deionized water | 57 | 57 | 57 | 147 | 60 | 57 |
| Ethanol | 3 | 3 | 3 | 3 | 0 | 3 |
| Styrene | — | — | — | 80 | — | — |
| Ethyl acrylate | — | — | — | 20 | — | — |
| PVA-205 | 5 | — | — | 5 | — | — |
| Polymerization initiator: | | | | | | |
| Potassium persulfate | — | — | 0.5 | 0.5 | — | — |
| Ammonium persulfate | 0.5 | 0.5 | — | — | 0.5 | — |
| Deionized water | 10 | 10 | 10 | 10 | 10 | 10 |
| Azobisisobutyronitrile (AIBN) | — | — | — | — | — | 0.5 |
| Monomer emulsion: | | | | | | |
| Deionized water | 90 | 90 | 90 | — | 90 | 90 |
| Styrene | 80 | 80 | 40 | — | 80 | 80 |
| Ethyl acrylate | 20 | 20 | — | — | 20 | 20 |
| Butyl acrylate | — | — | 60 | — | — | — |
| Butadiene | — | — | — | — | — | — |
| Methacrylic acid | — | — | — | — | — | — |
| t-Dodecyl mercaptan | — | — | — | — | — | — |
| PVA-205 | — | — | — | — | 10 | 10 |
| PVA-220E | — | — | — | — | — | — |
| Sodium lauryl sulfate | — | 5 | 5 | — | — | — |
| Polymerization conditions: | | | | | | |
| Polymerization temperature (° C.) | 80 | 80 | 80 | 80 | 80 | 80 |
| Period of time for monomer addition (hours) | 4 | 4 | 4 | 4 | 4 | 4 |
| PVA-205 after-addition | — | — | 5 | — | — | — |
| Copolymer emulsion | — | P | Q | — | — | — |

TABLE 3

| Example No. | Ex. 1 | Ex. 2 | Ex. 3 | Ex. 4 | Ex. 5 | Ex. 6 |
|---|---|---|---|---|---|---|
| Aqueous emulsion | A | B | C | D | G | F |
| Solid content (%) | 35 | 35 | 35 | 35 | 35 | 35 |
| pH | 2.2 | 2.2 | 2.2 | 2.2 | 2.2 | 2.2 |
| Viscosity (mPa · s) | 1,000 | 1,200 | 1,350 | 1,300 | 800 | 900 |
| Surface tension (mN/m) | 56 | 55 | 56 | 57 | 53 | 50 |
| Average particle diameter (μm) | 0.3 | 0.2 | 0.2 | 0.2 | 0.2 | 0.3 |
| Particle diameter distribution (μm) | 0.2~0.4 | 0.1~0.3 | 0.1~0.3 | 0.1~0.3 | 0.1~0.3 | 0.2~0.4 |
| Marlon stability (CG8) (%) | 0.0015 | 0.0018 | 0.0013 | 0.002 | 0.0015 | 0.044 |
| Calcium chloride chemical stability index | >30 | >30 | >30 | >30 | >30 | >30 |
| Graft bond | Found | Found | Found | Found | Found | Found |

TABLE 4

| Comparative Example No. | C.E. 1 | C.E. 2 | C.E. 3 | C.E. 4 | C.E. 5 | C.E. 6 |
|---|---|---|---|---|---|---|
| Aqueous emulsion | — | P | Q | — | — | — |
| Solid content (%) | *1 | 35 | 35 | *1 | *1 | *1 |
| pH | — | 2.3 | 2.2 | — | — | — |
| Viscosity (mPa · s) | — | 500 | 900 | — | — | — |
| Surface tension (mN/m) | — | 38 | 50 | — | — | — |
| Average particle diameter (μm) | — | 0.2 | 0.2 | — | — | — |
| Particle diameter distribution (μm) | — | 0.1~0.3 | 0.1~0.3 | — | — | — |
| Marlon stability (CG8) (%) | — | 0.067 | 0.067 | — | — | — |
| Calcium chloride chemical stability index | — | ≧0.5<br><0.5 | ≧20<br><20 | — | — | — |
| Graft bond | — | — | Not found | — | — | — |

*1 Gelled during polymerization

INDUSTRIAL APPLICABILITY

The polymer emulsion of the invention which is dispersion-stabilized with a water-soluble high-molecular-weight compound having an alcoholic hydroxyl group has excellent mechanical stability, chemical stability, and water resistance and alcohol dispersibility.

According to the process of the invention wherein an emulsion polymerization is carried out by using a water-soluble high-molecular-weight compound having an alcoholic hydroxyl group as a dispersing agent, monomers exhibiting a relatively low free-radical reactivity such as acrylic acid ester monomers, methacrylic acid ester monomers, styrenic monomers and diene monomers, as well as vinyl ester monomers, can be stably polymerized, in a striking contrast to the conventional process by which the monomers having a relatively low free-radical reactivity are difficult to polymerize.

In view of the above-mentioned excellent properties, the aqueous polymer emulsion of the invention are useful for an adhesive, a coating compound, a processing agent for paper, a binder for inorganic materials, an additive for cement and a mortar primer, and it is expected to be of an enhanced practical use in industry.

We claim:

1. An aqueous emulsion of a homopolymer consisting of units of a monomer selected from the group consisting of an acrylic acid ester monomer, a methacrylic acid ester monomer, a styrenic monomer and a diene monomer, or a copolymer predominantly comprised of units of at least one monomer selected from said group of monomers, which is dispersion-stabilized with a vinyl alcohol polymer having a molecular weight of at least 300 and having an alcoholic hydroxyl group, a viscosity average degree of polymerization of 50 to 8,000, and a degree of saponification of 40% to 99.99%; characterized in that said homopolymer or copolymer is in the form of particles having an average particle diameter of 0.05 μm to 5 μm and said aqueous emulsion has a calcium chloride chemical stability index of at least 20 and a surface tension of at least 45 mN/m as measured at a solid content concentration of 30% by weight;

that the amount of the vinyl alcohol polymer is in the range of 0.01 to 100 parts by weight based on 100 parts by weight of the homopolymer or the copolymer;

that at least part of the vinyl alcohol polymer is graft-bonded to the homopolymer or copolymer; and further that the amount of the homopolymer or copolymer having graft-bonded thereto the vinyl alcohol polymer is in the range of 0.5% to 30% by weight based on the sum of the homopolymer or copolymer having grafted thereto the vinyl alcohol polymer and the homopolymer or copolymer, to which the vinyl alcohol polymer has not been grafted.

2. A process for producing the aqueous emulsion as claimed in claim 1, characterized in that either one kind of a monomer selected from the group consisting of an acrylic acid ester monomer, a methacrylic acid ester monomer, a styrenic monomer and a diene monomer, or a monomer mixture predominantly comprised of at least one kind of a monomer selected from said group of monomers, is polymerized in an aqueous medium in the presence of an alcohol and a polymerization initiator generating a peroxide free-radical as the sole polymerization initiator, while the monomer or monomer mixture and a vinyl alcohol polymer having a molecular weight of at least 300 and having an alcoholic hydroxyl group, a viscosity average degree of polymerization of 50 to 8,000, and a degree of saponification of 40% to 99.99%, are incorporated continuously or intermittently into a polymerization system.

3. The production process according to claim 2, wherein the amount of the vinyl alcohol polymer is in the range of 0.01 to 100 parts by weight based on 100 parts by weight of the monomer or monomer mixture.

4. The production process according to claim 1, wherein the amount of the alcohol is in the range of 0.5 to 50 parts by weight based on 100 parts by weight of the monomer or monomer mixture.

5. The production process according to claim 1, wherein the polymerization initiator is a persulfate salt.

6. The production process according to claim 2, wherein the monomer or monomer mixture is incorporated into the polymerization system at a rate such that the polymerization conversion is maintained at 10% by weight or more during the polymerization.

7. The production process according to claim 2 wherein the monomer or monomer mixture and the vinyl alcohol polymer are simultaneously incorporated into the polymerization system.

* * * * *

UNITED STATES PATENT AND TRADEMARK OFFICE
CERTIFICATE OF CORRECTION

PATENT NO. : 6,448,330 B1
APPLICATION NO. : 09/701305
DATED : September 10, 2002
INVENTOR(S) : Toshihiro Inoue et al.

It is certified that error appears in the above-identified patent and that said Letters Patent is hereby corrected as shown below:

On the Title Page:

In item (30) change "May 28, 1998 (JP) ...... 10-164225" to --May 28, 1998 (JP) ... 10-164224--.

Signed and Sealed this

Twenty-ninth Day of January, 2008

JON W. DUDAS
*Director of the United States Patent and Trademark Office*